US008983561B2

(12) United States Patent
Okada et al.

(10) Patent No.: US 8,983,561 B2
(45) Date of Patent: Mar. 17, 2015

(54) IN-VEHICLE APPARATUS

(75) Inventors: Noriaki Okada, Chiryu (JP); Arinobu Kimura, Toyota (JP); Hiroki Okada, Toyota (JP); Hiroko Murakami, Toyota (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 856 days.

(21) Appl. No.: 13/199,897

(22) Filed: Sep. 12, 2011

(65) Prior Publication Data

US 2012/0064830 A1    Mar. 15, 2012

(30) Foreign Application Priority Data

Sep. 14, 2010 (JP) .................................. 2010-205287

(51) Int. Cl.
*H04B 1/00* (2006.01)
*B60C 23/04* (2006.01)
*B60R 25/20* (2013.01)

(52) U.S. Cl.
CPC ........... *B60C 23/0418* (2013.01); *B60C 23/044* (2013.01); *B60R 25/2072* (2013.01)
USPC ...................... 455/575.9; 455/152.1; 455/297; 455/345

(58) Field of Classification Search
CPC ...................................................... H04B 1/082
USPC ............................ 455/575.9, 152.1, 297, 345
See application file for complete search history.

(56) References Cited

U.S. PATENT DOCUMENTS

| | | | | |
|---|---|---|---|---|
| 3,754,187 | A  * | 8/1973 | Deming | 340/13.26 |
| 8,026,803 | B2 * | 9/2011 | Lin et al. | 340/445 |
| 8,410,631 | B2 * | 4/2013 | Chakam | 307/9.1 |
| 2003/0046993 | A1 * | 3/2003 | Fujii | 73/146.5 |
| 2004/0095232 | A1 * | 5/2004 | Okubo et al. | 340/445 |
| 2005/0191966 | A1 * | 9/2005 | Katsuta | 455/68 |
| 2007/0164876 | A1 * | 7/2007 | Ostrander et al. | 340/825.72 |
| 2008/0020723 | A1 * | 1/2008 | Rabinovich et al. | 455/152.1 |
| 2008/0150712 | A1 * | 6/2008 | Cooprider et al. | 340/447 |
| 2009/0102634 | A1 | 4/2009 | Okada et al. | |

FOREIGN PATENT DOCUMENTS

| | | |
|---|---|---|
| JP | 2003-81059 | 3/2003 |
| JP | 2006-214240 | 8/2006 |
| JP | 2007-271492 | 10/2007 |
| JP | 2009-97272 | 5/2009 |

* cited by examiner

*Primary Examiner* — Wen Huang
(74) *Attorney, Agent, or Firm* — Harness, Dickey & Pierce, PLC

(57) ABSTRACT

A frequency switching terminal is provided to input a signal for switching frequencies of a reception circuit. A smart ECU is connected to the frequency switching terminal via a connection cable. When the signal for switching the frequencies is inputted into an external input terminal of the reception circuit from the smart ECU via the frequency switching terminal, the reception circuit receives a first electric wave transmitted from a portable terminal for smart entry. In contrast, when the signal for switching the frequencies is not inputted into the external input terminal of the reception circuit from the smart ECU via the frequency switching terminal, the reception circuit receives a second electric wave transmitted from a tire sensor.

6 Claims, 3 Drawing Sheets

| XC1 | XC2 | RCO | CSEL | REC FREQUENCY |
|-----|-----|-----|------|---------------|
| 0 | 0 | L | - | T1 |
| 1 | 0 | H | L | S1 |
| 0 | 1 | L | - | - |
| 1 | 1 | H | H | S2 |

IN-VEHICLE APPARATUS

CROSS REFERENCE TO RELATED APPLICATION

The present application is based on and incorporates herein by reference Japanese Patent Application No. 2010-205287 filed on Sep. 14, 2010.

FIELD OF THE INVENTION

The present invention relates to an in-vehicle apparatus which receives electric waves from either a transmitter for smart entry or a transmitter for tire pressure monitor by selecting a reception frequency.

BACKGROUND OF THE INVENTION

[Patent document 1] JP-2003-81059 A (US 2003/0046993 A1)
[Patent document 2] JP-2009-97272 A (US 2009/0102634 A1)

There is conventionally existing an apparatus that integrates a function of a keyless entry apparatus and a function of a tire pressure monitoring apparatus to each other by adopting a common component member such as a high frequency reception section that is used in common by the two functions. Such an integrating apparatus switches functions of the keyless entry apparatus and the tire pressure monitoring apparatus in conjunction with an ignition switch turning into ON and OFF states (see Patent document 1).

There is an area or nation such as the United States of America where installing of the tire pressure monitoring apparatus is compulsory. Such an area has a needs to primarily install the function as a tire pressure monitoring apparatus whereas eliminating the function as a keyless entry apparatus. Therefore, a system which integrates the function of the tire pressure monitoring apparatus and the function of the keyless entry apparatus is desirably configured to function as the tire pressure apparatus by easily separating the smart ECU for controlling smart entry. Thus, there is an apparatus in which the smart ECU may be easily separated (for example, refer to Patent document 2).

In contrast, there is an area or nation such as Japan where installing of the tire pressure monitoring apparatus is not compulsory, for example. Such an area has a needs to primarily install the function as a keyless entry apparatus whereas eliminating the function as a tire pressure monitoring apparatus.

In the apparatus described in above Patent document 2, a microcomputer for a tire pressure monitoring apparatus (TPMS microcomputer) is to switch the reception frequencies of the reception circuit depending on an ignition switch turning ON and OFF and the voltage of a voltage signal terminal RCO inputted from a smart ECU. Even if the integrating apparatus is intended to function only as a smart entry, the installing of the TPMS microcomputer is necessary, posing a problem.

SUMMARY OF THE INVENTION

The present invention is made in view of the above problem. It is an object of the present invention to provide an in-vehicle apparatus that achieves a reception function as a tire pressure monitoring apparatus by easily separating a smart ECU while achieving a reception function as a smart entry apparatus even without installing a TPMS microcomputer.

To achieve the above object, according to an aspect of the invention, an in-vehicle apparatus is provided as follows. A reception IC is included to contain a first external input terminal, the reception IC receiving one of a first electric wave and a second electric wave by switching reception frequencies depending on a signal inputted to the first external input terminal, the first electric wave being transmitted from a first transmitter for smart entry, the second electric wave being transmitted from a second transmitter for tire pressure monitoring. A first frequency switching terminal is included to input a frequency switching signal to switch the reception frequencies, the first frequency switching terminal being enabled to be connected to a smart entry controller for smart entry via a connection cable. Herein, when the first frequency switching terminal is connected with the smart entry controller using the connection cable so that the frequency switching signal is inputted into the first external input terminal from the smart entry controller via the first frequency switching terminal, the reception IC receives the first electric wave transmitted from the first transmitter using a reception frequency specified by the frequency switching signal from the smart entry controller. When the frequency switching signal is not inputted into the first external input terminal from the smart entry controller via the first frequency switching terminal, the reception IC receives the second electric wave transmitted from the second transmitter.

Under such a configuration, when the frequency switching signal is not inputted into the first external input terminal from the smart entry controller via the first frequency switching terminal, the reception IC receives the second electric wave transmitted from the second transmitter. Thus, the releasing or detaching the connection cable can easily achieve a separation of the smart entry controller (i.e., smart ECU), thereby achieving a reception function as a tire pressure monitoring apparatus. Furthermore, in cases that the smart entry controller (i.e., smart ECU) is connected to the first frequency switching terminal, the reception IC receives the first electric wave transmitted from the first transmitter using a reception frequency specified by the frequency switching signal when the frequency switching signal is inputted into the first external input terminal from the smart entry controller via the first frequency switching terminal, while the reception IC receives the second electric wave transmitted from the second transmitter when the frequency switching signal is not inputted into the first external input terminal from the smart entry controller via the first frequency switching terminal. Thus, a reception function of a smart entry apparatus can be achieved even without installing a TPMS microcomputer.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
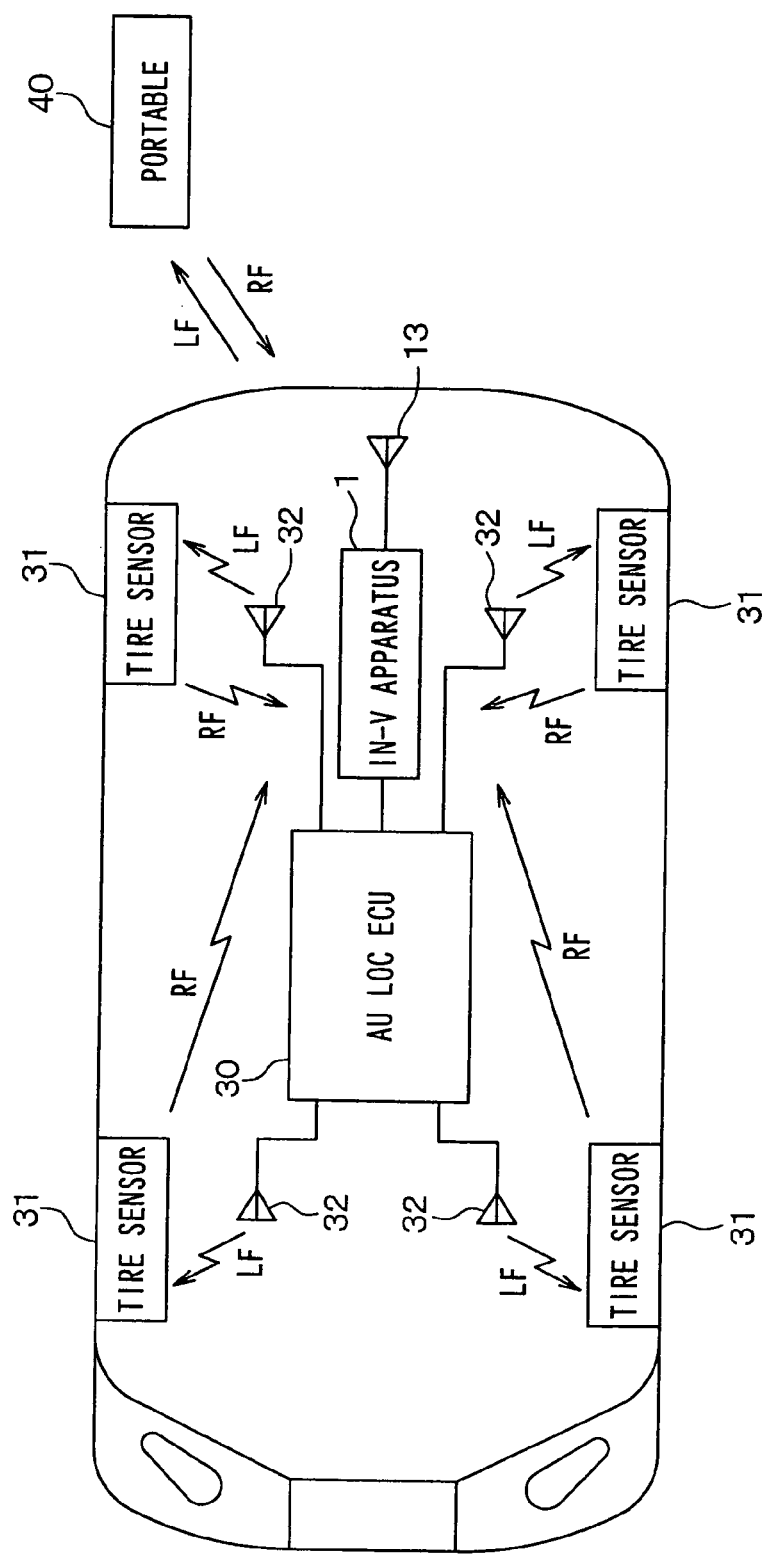
FIG. 1 is a diagram illustrating an overall configuration of an in-vehicle apparatus according to an embodiment of the present invention.

An overall configuration of an in-vehicle apparatus according to an embodiment of the present invention is illustrated in FIG. 1. The present in-vehicle apparatus 1 is mounted in a subject vehicle and integrates a function of a tire pressure monitoring system (also referred to as TPMS) and a function of a smart entry system. That is, the in-vehicle apparatus 1 is to receive electric waves from either a portable terminal 40 for smart entry or a tire sensor 31 for tire pressure monitor by selecting a reception frequency. The in-vehicle apparatus 1 is connected with an ECU (Electronic Control Unit) 30 for automatic location and an exclusive antenna 13 for smart entry in a trunk room of the vehicle.

The tire pressure monitoring system (TPMS) operates as follows. The tire sensor 31 is attached to each tire of the vehicle and detects information such as an air pressure of each tire. The information detected by each tire sensor 31 is wirelessly transmitted to the in-vehicle apparatus 1. The in-vehicle apparatus 1 receives the information transmitted from each tire sensor 31 and notifies a user or driver of the vehicle of an anomaly in a tire pressure or temperature, if present.

The ECU 30 for automatic location is connected with each antenna 32 that is arranged so as to correspond to each tire of the vehicle. The ECU 30 for auto location transmits or executes a transmission request to the tire sensors 31 at mutually different or separated (no-overlapped) times to the antennas 32, respectively, using an electric wave of an LF band. In addition, the four tire sensors 31 transmit detection information to the in-vehicle apparatus 1 using an electric wave of an RF band at mutually different or separated (no-overlapped) times, respectively.

In contrast, the smart entry system operates as follows. When the portable terminal 40 held by the user of the vehicle enters a wireless communication area in a vicinity of the vehicle, an authentication is made between the in-vehicle apparatus 1 and the portable terminal 40. When the authentication is successfully made or completely, a predetermined control is made so as to unlock a door of the vehicle and permit an engine start. In the smart entry system, the in-vehicle apparatus 1 makes an authentication or verification to the portable terminal 40 using an electric wave of an LF band, whereas the portable terminal 40 transmits information to the in-vehicle apparatus 1 using an electric wave of an RF band.

That is, the portable terminal 40 and the tire sensor 31 transmit information to the in-vehicle apparatus 1 using the electric wave of the RF band. In the present embodiment, the frequency of the electric wave transmitted from the portable terminal 40 is one of the two frequencies, 314 MHz and 312 MHz; the frequency of the electric wave transmitted from the tire sensor 31 is 315 MHz.

Therefore, the reception circuit 11 of the in-vehicle apparatus 1 is shared (e.g., used in common) by the TPMS and the smart entry system. The reception circuit 11 receives each electric wave transmitted from the portable terminal 40 and the tire sensor 31 by switching the reception frequencies.

Figure 2:
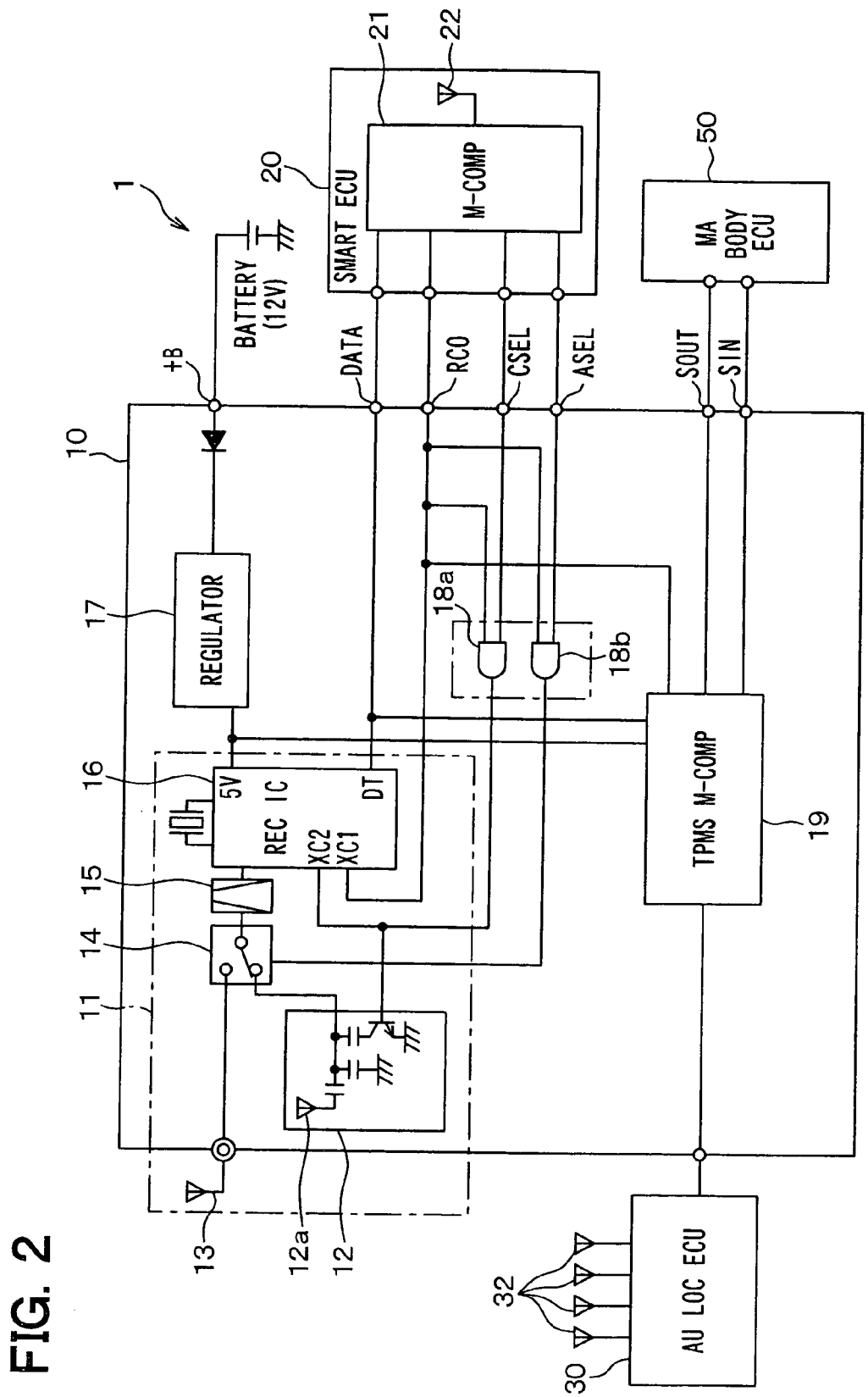
FIG. 2 is a diagram illustrating a functional configuration of the in-vehicle apparatus.

FIG. 2 illustrates a configuration of the present in-vehicle apparatus 1. The in-vehicle apparatus 1 includes a tuner 10 and a smart ECU 20. It is noted that the tuner 10 has a DATA terminal, an RCO terminal, a CSEL terminal, and an ASEL terminal. The DATA terminal is to transmit or output reception data received by a reception IC (Integrated Circuit) 16 to the smart ECU 20. The RCO terminal is to receive or input a frequency switching signal for switching reception frequencies of a first electric wave that is transmitted from the portable terminal 40, and a second electric wave that is transmitted from each tire sensor 31. The CSEL terminal is to receive or input a frequency switching signal for switching reception frequencies of or within the first electric wave that is transmitted from the portable terminal 40. The ASEL terminal is to receive or input an antenna switching signal for switching an antenna switching circuit 14.

The DATA terminal, the RCO terminal, the CSEL terminal, and the ASEL terminal are in a connector connection with a connection cable that is connected to the smart ECU 20. The present in-vehicle apparatus 1 is characterized in the following. The connector connection that is made between the tuner 10 and the smart ECU 20 using the connection cable enables a function of an integrative system of the TPMS and the smart entry system; the detaching or releasing of the connector connection made between the tuner 10 and the smart ECU 20 using the connection cable enables a function of the TPMS alone. Further, in the case that the TPMS microcomputer 19 is not mounted in the tuner 10, the connector connection made between the tuner 10 and the smart ECU 20 using the connection cable enables a function of the smart entry system alone.

Each input terminal of the RCO terminal, the CSEL terminal, and the ASEL terminal is vacant when the smart ECU 20 is not connected. Thus, a pulldown connection is made to each input terminal via a resistance (unshown), individually.

The tuner 10 includes the following: a reception circuit 11 to receive electric waves of an RF band; a regulator 17 to convert a power source voltage supplied from a battery connected to +B terminal into 5V; AND circuits 18a, 18b; and a TPMS microcomputer 19 to control the function of the TPMS.

The reception circuit 11 includes the following: an antenna matching switching circuit 12; an exclusive antenna 13 for smart entry provided in a trunk of the vehicle; an antenna switching circuit 14; a filter 15; and a reception IC 16.

The antenna matching switching circuit 12 has a common antenna 12a that is used in common by the smart entry system and the TPMS to receive the electric waves of the RF band. Depending on the logical levels of an output signal of the AND circuit 18a, impedance matching of the common antenna 12a changes.

The exclusive antenna 13 is arranged in a trunk room of the vehicle to be exclusive to the smart entry system for receiving the electric wave transmitted from the portable terminal 40. The exclusive antenna 13 is connected to the tuner 10 via a connector terminal, and is able to be detached when unnecessary.

The antenna switching circuit 14 changes the antennas to select an antenna connected to the reception IC 16 depending on the logical levels of the output signal of the AND circuit 18b.

The filter 15 is to remove a noise of a signal inputted into the reception IC 16 via the antenna switching circuit 14. The filter 15 functions as a band pass filter.

The reception IC 16 switches the reception frequencies to receive a signal inputted via the antenna switching circuit 14. The reception IC 16 includes a first external input terminal XC1 to switch reception frequencies, and a second external input terminal XC2 to switch reception frequencies.

The first input terminal of the AND circuit 18a is connected to the RCO terminal. The second input terminal of the AND circuit 18a is connected to the CSEL terminal. The output terminal of the AND circuit 18a is connected to the XC2 terminal of the reception IC 16. When the frequency switching signal is not inputted into the AND circuit 18a via the RCO terminal, a signal inputted into the XC2 terminal of the reception IC 16 is masked.

The first input terminal of the AND circuit 18b is connected to the RCO terminal. The second input terminal of the AND circuit 18b is connected to the ASEL terminal. The output terminal of the AND circuit 18b is connected to the antenna switching circuit 14. When the frequency switching signal is not inputted into the AND circuit 18b via the RCO terminal, a signal inputted into the antenna switching circuit 14 from the ASEL terminal is masked.

Figures 3, 4:
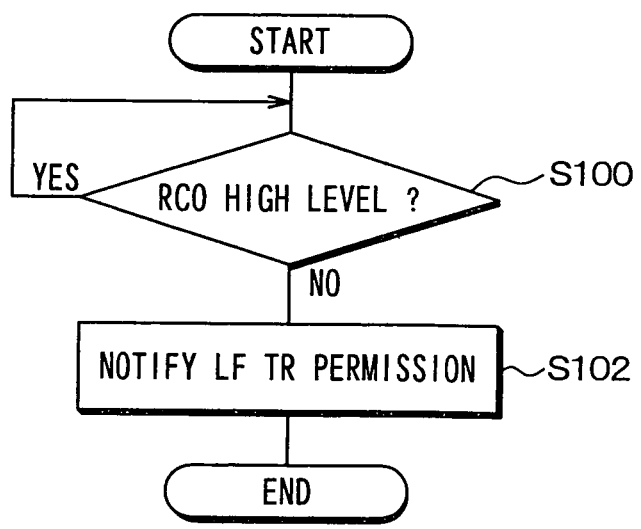
FIG. 3 is a diagram illustrating relation of states of terminals and reception frequencies.
FIG. 4 is a flowchart diagram illustrating a process executed by a microcomputer.

FIG. 3 illustrates a relation of the states of the XC1 terminal and XC2 terminal of the reception IC 16, the states of the RCO terminal and CSEL terminal, and the reception frequencies. Here, S1 indicates that the reception frequency is S1=314 MHz; S2 indicates that the reception frequency is S2=312 MHz; and T1 indicates that the reception frequency is T1=315 MHz. It is noted that the AND circuits 18a, 18b are provided so as not to create the state of XC1=0 and XC2=1.

The TPMS microcomputer 19 contains a memory and executes various processes based on programs stored in the memory.

Next, a process by the TPMS microcomputer 19 is explained with reference to FIG. 4. The TPMS microcomputer 19 executes the present process repeatedly when an ignition switch of the vehicle is turned into the ON state, or when it is determined that the vehicle starts traveling based on a speed signal inputted from the vehicle.

It is further noted that the flowchart or the processing of the flowchart in FIG. 4 includes sections (also referred to as steps), which are represented, for instance, as S100. Further, each section can be divided into several sub-sections while several sections can be combined into a single section. Furthermore, each of thus configured sections can be referred to as a device, means, or module and achieved not only as a software section in combination with a hardware device but also as a hardware section.

At S100, it is determined whether the voltage of the RCO terminal is in the high level. When the frequency switching signal is not inputted into the RCO terminal from the smart ECU 20, the determination at S100 is negated as NO. Then, at S102, a permission notification is made such that a permission signal to permit a transmission of an electric wave of the LF band is notified to the automatic location ECU 30. The case where the frequency switching signal is not inputted into the RCO terminal from the smart ECU 20 includes the following: the case where the smart ECU 20 is in the sleep state even when the smart ECU 20 is connected to the tuner 10 via the connection cable; the case where the smart ECU 20 is not connected using the connection cable; and the case where the smart ECU 20 is malfunctioned.

According to the permission notification, the automatic location ECU 30 makes a transmission instruction to the tire sensors 31 to transmit information on tire pressure. Then, the information on tire pressure that is transmitted from the tire sensors 31 is received by the reception circuit 11. When the information on tire pressure is inputted from the reception circuit 11, the TPMS microcomputer 19 transmits the information on tire pressure to a main body ECU 50.

Further, in the case where the smart ECU 20 is connected to the tuner 10 via the connection cable so that the voltage of the RCO terminal is in the high level, the determination at S100 is affirmed as YES, thereby repeating the determination at S100. That is, the determination at S100 is repeated without transmitting a transmission request to the tire sensors 31 via the automatic location ECU 30.

Further, while outputting the frequency switching signal so that the voltage of the RCO terminal turns into the high level, the smart ECU 20 executes an authentication or verification with the portable terminal 40. When the authentication is successfully made, a predetermined control is made so as to unlock a door of the vehicle and permit an engine start.

Under the above configuration, when the frequency switching signal is not inputted into the first external input terminal XC1 from the smart ECU 20 via the first frequency switching terminal RCO, the reception circuit 11 receives the second electric wave transmitted from the tire sensors 31. Thus, the releasing or detaching the connection cable can easily achieve a separation of the smart ECU 20, thereby achieving a reception function as a tire pressure monitoring apparatus. Further, when the smart ECU 20 is connected to the first frequency switching terminal RCO so that the frequency switching signal is inputted into the first external input terminal XC1 from the smart ECU 20 via the first frequency switching terminal (RCO), the reception circuit 11 receives the first electric wave transmitted from the portable terminal 40 using a reception frequency specified by the frequency switching signal. In contrast, when the frequency switching signal is not inputted into the first external input terminal XC1 from the smart ECU 20 via the first frequency switching terminal RCO, the reception circuit 11 receives the second electric wave transmitted from the tire sensors 31. Thus, a reception function for smart entry can be achieved even without installing the TPMS microcomputer 19.

Furthermore, when the smart ECU 20 is connected to the first and second frequency switching terminals RCO, CSEL so that the frequency switching signal is inputted into the first external input terminal XC1 from the smart ECU 20 via the first frequency-switching terminal RCO, the reception circuit 11 can receive the first electric wave transmitted from the portable terminal 40 at the reception frequency specified by the signal inputted into the second external input terminal XC via the second frequency switching terminal CSEL.

In addition, when it is determined, based on the voltage level of the first frequency switching terminal RCO, that the reception frequency of the reception circuit 11 is set to the frequency to receive the second electric wave transmitted from the tire sensors 31, the transmission permission of the second electric wave by the tire sensors 31 is made. In other words, this can prevent the event that causes the TPMS microcomputer 19 to allow the transmission of the second electric wave for a duration in which the smart ECU 20 uses the reception circuit 11.

In addition, the antenna switching circuit 14 can switch over such that either the reception signal received by the common antenna 12a or the reception signal received by the exclusive antenna 13 be inputted into the reception circuit 11 depending on the signal inputted from the smart ECU 20 via the antenna switching terminal ASEL.

In addition, when the frequency switching signal is not inputted into the first frequency switching terminal RCO, the signal inputted into the second frequency switching terminal CSEL is masked not to be inputted into the external input terminal XC by the AND circuit 18a. For example, even if an anomaly signal is inputted into the second frequency switching terminal CSEL because of the failure to the smart ECU 20 or peripheral noises, the influence by the anomaly signal can be prevented.

In addition, when the frequency switching signal is not inputted into the first frequency switching terminal RCO, the signal inputted into the antenna switching terminal ASEL is masked not to be inputted into the antenna switching circuit 14 by the AND circuit 18b. For example, even if an anomaly signal is inputted into the antenna switching terminal ASEL because of the failure to the smart ECU 20 or peripheral noises, the influence by the anomaly signal can be prevented.

In addition, the present invention is not limited to the above embodiment and can be achieved in various modified manners based on the scope of the present invention.

Further, in the above embodiment, the reception IC 16 is configured to include two external input terminals XC1, XC2. There is no need to be limited to such a configuration. The reception IC 16 may include only the external input terminal XC1. The reception IC 16 may include three or more input terminals.

Further, in the above embodiment, when the frequency switching signal is not inputted into the first frequency switching terminal RCO, the masking is made using the AND circuit 18*a* and the AND circuit 18*b* such that an anomaly signal is not inputted into the second frequency switching terminal CSEL or the antenna switching circuit 14. Alternatively, another circuit other than the AND circuit may be used. In addition, instead of using the AND circuits 18*a*, 18*b*, the signal inputted into the second frequency switching terminal CSEL may be directly inputted into the XC1 terminal of the reception circuit 11, while the signal inputted into the antenna switching terminal ASEL may be directly inputted into the antenna switching circuit 14.

Further, in the above embodiment, the tuner 10 is configured to contain the TPMS microcomputer 19. Alternatively, for example, a circuit board of a tuner may not contain a pad, SIN terminal, SOUT terminal, etc which are for mounting the TPMS microcomputer 19; namely, the tuner may not be provided with the TPMS function. Thereby, another configuration may be provided where the tuner without having the TPMS function or the tuner 10 illustrated in FIG. 2 is selectively connected to the smart ECU 20. The tuner without having the TPMS function may be configured such that the power source for the smart ECU 20 may be connected to the RCO terminal of the tuner.

Further, in the above embodiment, the permission for transmitting the electric wave of the LF band is notified to the automatic location ECU 30 connected to the present in-vehicle apparatus 1. Alternatively, without using the automatic location ECU 30, the permission for transmitting the electric wave of the LF band may be notified to each tire sensor 31 from the TPMS microcomputer 19 mounted in the present in-vehicle apparatus 1.

It will be obvious to those skilled in the art that various changes may be made in the above-described embodiments of the present invention. However, the scope of the present invention should be determined by the following claims.

What is claimed:

1. An in-vehicle apparatus comprising:
   a reception IC including a first external input terminal and a second external input terminal,
   the reception IC receiving one of a first electric wave and a second electric wave by switching reception frequencies depending on a signal inputted to the first external input terminal, the first electric wave being transmitted from a first transmitter for smart entry, the second electric wave being transmitted from a second transmitter for tire pressure monitoring,
   the reception IC being enabled to receive one of two different frequencies of the first electric wave transmitted from the first transmitter by switching the two different reception frequencies depending on a signal inputted into the second external input terminal;
   a first frequency switching terminal to input a frequency switching signal to switch the reception frequencies, the first frequency switching terminal being enabled to be connected to a smart entry controller for the smart entry via a connection cable; and
   a second frequency switching terminal to input a signal for switching the two different reception frequencies of the first electric wave transmitted from the first transmitter, the second frequency switching terminal being enabled to be connected to the smart entry controller for smart entry using the connection cable,
   wherein:
   when the first frequency switching terminal is connected with the smart entry controller using the connection cable and the frequency switching signal is inputted into the first external input terminal from the smart entry controller via the first frequency switching terminal, the reception IC receives the first electric wave transmitted from the first transmitter using a reception frequency specified by the frequency switching signal from the smart entry controller;
   when the first frequency switching terminal is connected with the smart entry controller using the connection cable and the frequency switching signal is not inputted into the first external input terminal from the smart entry controller via the first frequency switching terminal, the reception IC receives the second electric wave transmitted from the second transmitter; and
   when each of the first frequency switching terminal and the second frequency switching terminal is connected with the smart entry controller using the connection cable and the frequency switching signal is inputted into the first external input terminal from the smart entry controller via the first frequency switching terminal, the reception IC receives the first electric wave transmitted from the first transmitter using a reception frequency out of the two different frequencies specified by the signal inputted into the second external input terminal via the second frequency switching terminal.

2. The in-vehicle apparatus according to claim 1, further comprising:
   a transmission permission section to permit a transmission of the second electric wave by the second transmitter when determining that a reception frequency of the reception IC is set to a frequency to receive the second electric wave transmitted from the second transmitter based on a voltage level of the first frequency switching terminal.

3. The in-vehicle apparatus according to claim 1, further comprising:
   an antenna switching circuit to input one of (i) a reception signal received by a common antenna for both the smart entry and the tire pressure monitor and (ii) a reception signal received by an exclusive antenna for the smart entry, into the reception IC; and
   an antenna switching terminal to switch the antenna switching circuit, the antenna switching terminal being enabled to be connected to the smart entry controller using the connection cable,
   wherein the antenna switching circuit is switched such that one of (i) the reception signal received by the common antenna and (ii) the reception signal received by the exclusive antenna is inputted into the reception IC depending on the signal inputted from the smart entry controller via the antenna switching terminal.

4. The in-vehicle apparatus according to claim 3, further comprising:
   a second logic circuit including a first input terminal connected with the first frequency switching terminal and a second input terminal connected with the antenna switching terminal, the second logic circuit performing masking so that a signal inputted to the antenna switching terminal connected to the second input terminal is not inputted into the antenna switching circuit when the frequency switching signal is not inputted into the first frequency switching terminal connected to the first input terminal.

5. The in-vehicle apparatus according to claim 1, further comprising:
a first logic circuit including a first input terminal connected with the first frequency switching terminal and a second input terminal connected with the second frequency switching terminal, the first logic circuit performing masking so that a signal inputted to the second frequency switching terminal connected to the second input terminal is not inputted into the second external input terminal when the frequency switching signal is not inputted into the first frequency switching terminal connected to the first input terminal.

6. An in-vehicle apparatus comprising:
a reception IC including a first external input terminal, the reception IC receiving one of a first electric wave and a second electric wave by switching reception frequencies depending on a signal inputted to the first external input terminal, the first electric wave being transmitted from a first transmitter for smart entry, the second electric wave being transmitted from a second transmitter for tire pressure monitoring;
a first frequency switching terminal to input a frequency switching signal to switch the reception frequencies, the first frequency switching terminal being enabled to be connected to a smart entry controller for the smart entry via a connection cable; and
a circuit board to which the reception IC and the first frequency switching terminal are mounted,
wherein:
when the first frequency switching terminal is connected with the smart entry controller using the connection cable and the frequency switching signal is inputted into the first external input terminal from the smart entry controller via the first frequency switching terminal, the reception IC receives the first electric wave transmitted from the first transmitter using a reception frequency specified by the frequency switching signal from the smart entry controller;
when the first frequency switching terminal is connected with the smart entry controller using the connection cable and the frequency switching signal is not inputted into the first external input terminal from the smart entry controller via the first frequency switching terminal, the reception IC receives the second electric wave transmitted from the second transmitter; and
when the tire pressure monitoring is enabled, a microcomputer for the tire pressure monitoring is mounted on the circuit board.

* * * * *